US008010966B2

(12) United States Patent
Jeter et al.

(10) Patent No.: US 8,010,966 B2
(45) Date of Patent: Aug. 30, 2011

(54) MULTI-THREADED PROCESSING USING PATH LOCKS

(75) Inventors: Robert Jeter, Holly Springs, NC (US); Trevor Garner, Apex, NC (US); John Marshall, Cary, NC (US); Aaron Kirk, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1282 days.

(21) Appl. No.: 11/535,956

(22) Filed: Sep. 27, 2006

(65) Prior Publication Data

US 2008/0077926 A1 Mar. 27, 2008

(51) Int. Cl.
G06F 9/46 (2006.01)
(52) U.S. Cl. .......................... 718/102; 718/103
(58) Field of Classification Search .................. 718/102, 718/103
See application file for complete search history.

(56) References Cited

U.S. PATENT DOCUMENTS

| | | | |
|---|---|---|---|
| 4,096,571 A | 6/1978 | Vander Mey | |
| 4,400,768 A | 8/1983 | Tomlinson | |
| 4,918,600 A | 4/1990 | Harper, III | |
| 5,088,032 A | 2/1992 | Bosack | |
| 5,247,645 A | 9/1993 | Mirza | |
| 5,394,553 A | 2/1995 | Lee | |
| 5,428,803 A | 6/1995 | Chan | |
| 5,479,624 A | 12/1995 | Lee | |
| 5,561,669 A | 10/1996 | Lenney et al. | |
| 5,561,784 A | 10/1996 | Chen | |
| 5,613,114 A | 3/1997 | Anderson et al. | |
| 5,617,421 A | 4/1997 | Chin | |
| 5,724,600 A | 3/1998 | Ogi | |
| 5,740,171 A | 4/1998 | Mazzola et al. | |
| 5,742,604 A | 4/1998 | Edsall et al. | |
| 5,764,636 A | 6/1998 | Edsall | |
| 5,787,255 A | 7/1998 | Parlan et al. | |
| 5,787,485 A | 7/1998 | Fitzgerald et al. | |
| 5,796,732 A | 8/1998 | Mazzola et al. | |
| 5,838,915 A | 11/1998 | Klausmeier et al. | |
| 5,852,607 A | 12/1998 | Chin | |

(Continued)

FOREIGN PATENT DOCUMENTS

EP 0744696 11/1996

(Continued)

OTHER PUBLICATIONS

U.S. Appl. No. 11/446,609, Jeter et al.

(Continued)

*Primary Examiner* — Diem Cao
(74) *Attorney, Agent, or Firm* — Patent Capital Group

(57) ABSTRACT

In one embodiment, a method includes receiving at a thread scheduler data that indicates a first thread is to execute next a particular instruction path in software to access a particular portion of a shared computational resource. The thread scheduler determines whether a different second thread is exclusively eligible to execute the particular instruction path on any processor of a set of one or more processors to access the particular portion of the shared computational resource. If so, then the thread scheduler prevents the first thread from executing any instruction from the particular instruction path on any processor of the set of one or more processors. This enables several threads of the same software to share a resource without obtaining locks on the resource or holding a lock on a resource while a thread is not running.

20 Claims, 9 Drawing Sheets

U.S. PATENT DOCUMENTS

| | | | |
|---|---|---|---|
| 5,909,550 | A | 6/1999 | Shankar et al. |
| 5,982,655 | A | 11/1999 | Doyle |
| 6,026,464 | A | 2/2000 | Cohen |
| 6,119,215 | A | 9/2000 | Key et al. |
| 6,148,325 | A * | 11/2000 | Schmidt et al. ............... 718/107 |
| 6,178,429 | B1 | 1/2001 | Cherf |
| 6,195,107 | B1 | 2/2001 | Iverson |
| 6,222,380 | B1 | 4/2001 | Gerowitz et al. |
| 6,272,520 | B1 | 8/2001 | Sharangpani et al. |
| 6,272,621 | B1 | 8/2001 | Key et al. |
| 6,308,219 | B1 | 10/2001 | Hughes |
| 6,430,242 | B1 | 8/2002 | Buchanan et al. |
| 6,470,376 | B1 | 10/2002 | Tanaka et al. |
| 6,487,202 | B1 | 11/2002 | Klausmeier et al. |
| 6,487,591 | B1 | 11/2002 | Budhraja et al. |
| 6,505,269 | B1 | 1/2003 | Potter |
| 6,529,983 | B1 | 3/2003 | Marshall et al. |
| 6,535,963 | B1 | 3/2003 | Rivers |
| 6,587,955 | B1 * | 7/2003 | Foote et al. ................... 713/400 |
| 6,611,217 | B2 | 8/2003 | Buchanan et al. |
| 6,662,252 | B1 | 12/2003 | Marshall et al. |
| 6,681,341 | B1 | 1/2004 | Fredenburg et al. |
| 6,700,889 | B1 | 3/2004 | Nun |
| 6,708,258 | B1 | 3/2004 | Potter et al. |
| 6,718,448 | B1 | 4/2004 | Ofer |
| 6,728,839 | B1 | 4/2004 | Marshall |
| 6,757,768 | B1 | 6/2004 | Potter et al. |
| 6,795,901 | B1 | 9/2004 | Florek et al. |
| 6,801,997 | B2 | 10/2004 | Joy et al. |
| 6,804,162 | B1 | 10/2004 | Eldridge et al. |
| 6,804,815 | B1 | 10/2004 | Kerr et al. |
| 6,832,279 | B1 | 12/2004 | Potter et al. |
| 6,839,797 | B2 | 1/2005 | Calle et al. |
| 6,845,501 | B2 | 1/2005 | Thompson et al. |
| 6,876,961 | B1 | 4/2005 | Marshall et al. |
| 6,895,481 | B1 | 5/2005 | Mitten et al. |
| 6,918,116 | B2 | 7/2005 | Ang |
| 6,920,562 | B1 | 7/2005 | Kerr et al. |
| 6,947,425 | B1 * | 9/2005 | Hooper et al. ................ 370/394 |
| 6,965,615 | B1 | 11/2005 | Kerr et al. |
| 6,970,435 | B1 | 11/2005 | Buchanan et al. |
| 6,973,521 | B1 | 12/2005 | Indiresan et al. |
| 6,986,022 | B1 | 1/2006 | Marshall et al. |
| 7,047,370 | B1 | 5/2006 | Jeter, Jr. et al. |
| 7,100,021 | B1 | 8/2006 | Marshall et al. |
| 7,124,231 | B1 | 10/2006 | Garner et al. |
| 7,139,899 | B2 | 11/2006 | Kerr et al. |
| 7,155,576 | B1 | 12/2006 | Garner et al. |
| 7,155,588 | B1 | 12/2006 | Jeter |
| 7,174,394 | B1 | 2/2007 | Garner et al. |
| 7,185,224 | B1 | 2/2007 | Fredenburg et al. |
| 7,194,568 | B2 | 3/2007 | Jeter |
| 7,254,687 | B1 | 8/2007 | Jeter |
| 7,257,681 | B2 | 8/2007 | Jeter et al. |
| 7,290,096 | B2 | 10/2007 | Jeter, Jr. et al. |
| 7,290,105 | B1 | 10/2007 | Jeter |
| 7,302,548 | B1 | 11/2007 | Mitten et al. |
| 7,346,059 | B1 | 3/2008 | Garner et al. |
| 7,411,957 | B2 | 8/2008 | Stacy et al. |
| 7,434,016 | B2 | 10/2008 | Jeter, Jr. |
| 7,447,872 | B2 | 11/2008 | Schroter et al. |
| 7,461,180 | B2 | 12/2008 | Lee et al. |
| 7,464,243 | B2 | 12/2008 | Haridas et al. |
| 7,623,455 | B2 | 11/2009 | Hilla et al. |
| 7,640,355 | B1 | 12/2009 | Marshall et al. |
| 7,848,332 | B2 | 12/2010 | Lee et al. |
| 2001/0001871 | A1 | 5/2001 | Rust |
| 2003/0048209 | A1 | 3/2003 | Buchanan et al. |
| 2003/0058277 | A1 | 3/2003 | Bowman |
| 2003/0159021 | A1 | 8/2003 | Kerr et al. |
| 2003/0225995 | A1 | 12/2003 | Schroter et al. |
| 2004/0139441 | A1 * | 7/2004 | Kaburaki et al. ............. 718/107 |
| 2004/0186945 | A1 | 9/2004 | Jeter et al. |
| 2004/0187112 | A1 | 9/2004 | Potter |
| 2004/0213235 | A1 | 10/2004 | Marshall et al. |
| 2004/0252710 | A1 | 12/2004 | Jeter, Jr. et al. |
| 2005/0010690 | A1 | 1/2005 | Marshall et al. |
| 2005/0100017 | A1 | 5/2005 | Williams et al. |
| 2005/0171937 | A1 | 8/2005 | Hughes et al. |
| 2005/0213570 | A1 | 9/2005 | Stacy et al. |
| 2006/0104268 | A1 | 5/2006 | Lee et al. |
| 2006/0117316 | A1 * | 6/2006 | Cismas et al. ................ 718/103 |
| 2006/0136682 | A1 | 6/2006 | Haridas et al. |
| 2006/0184753 | A1 | 8/2006 | Jeter, Jr. et al. |
| 2006/0221974 | A1 | 10/2006 | Hilla et al. |
| 2007/0067592 | A1 | 3/2007 | Jeter, Jr. |
| 2007/0095368 | A1 | 5/2007 | Girard et al. |
| 2007/0169001 | A1 * | 7/2007 | Raghunath et al. ........... 717/130 |
| 2007/0220232 | A1 * | 9/2007 | Rhoades et al. ................ 712/20 |
| 2007/0226739 | A1 * | 9/2007 | Dodge et al. .................. 718/102 |
| 2007/0294694 | A1 | 12/2007 | Jeter |
| 2008/0005296 | A1 | 1/2008 | Lee et al. |
| 2008/0013532 | A1 | 1/2008 | Garner et al. |
| 2008/0077926 | A1 | 3/2008 | Jeter et al. |

FOREIGN PATENT DOCUMENTS

WO    WO2004/095290    11/2004

OTHER PUBLICATIONS

U.S. Appl. No. 11/454,820, Jeter et al.
PCT International Preliminary Report on Patentability mailed Sep. 23, 2005 for PCT/US04/05522; 11 pages.
PCT International Search Report mailed Oct. 18, 2004 for PCT/US04/05522; 3 pages.
USPTO Final Rejection mailed Mar. 16, 2011 from U.S. Appl. No. 11/446,609.
USPTO Nov. 18, 2010 Nonfinal Office Action from U.S. Appl. No. 11/454,820.
USPTO Feb. 18, 2011 Response to Nov. 18, 2010 Nonfinal Office Action from U.S. Appl. No. 11/454,820.
USPTO Apr. 26, 2011 Notice of Allowance from U.S. Appl. No. 11/454,820.

* cited by examiner

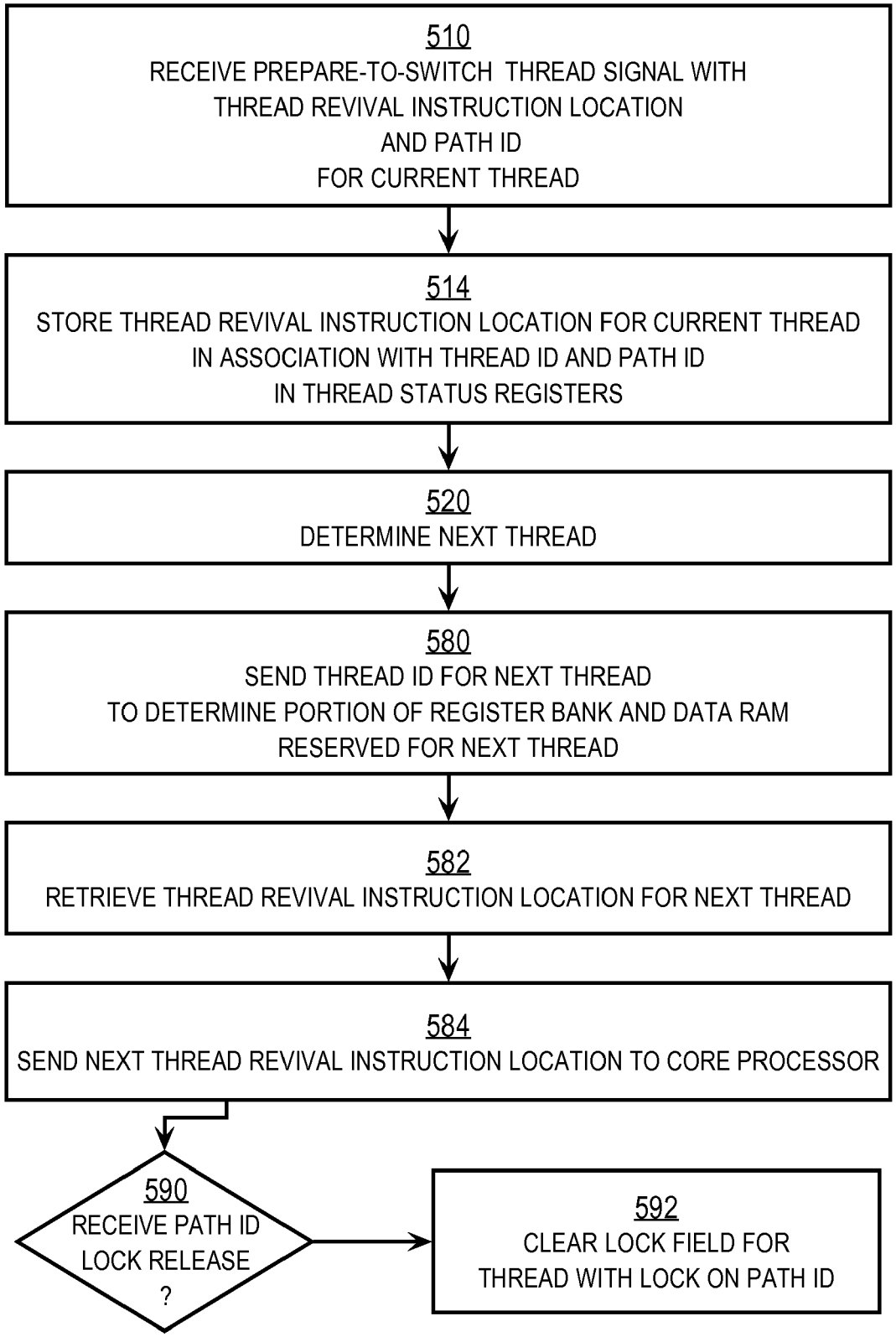

521 METHOD TO DETERMINE NEXT THREAD

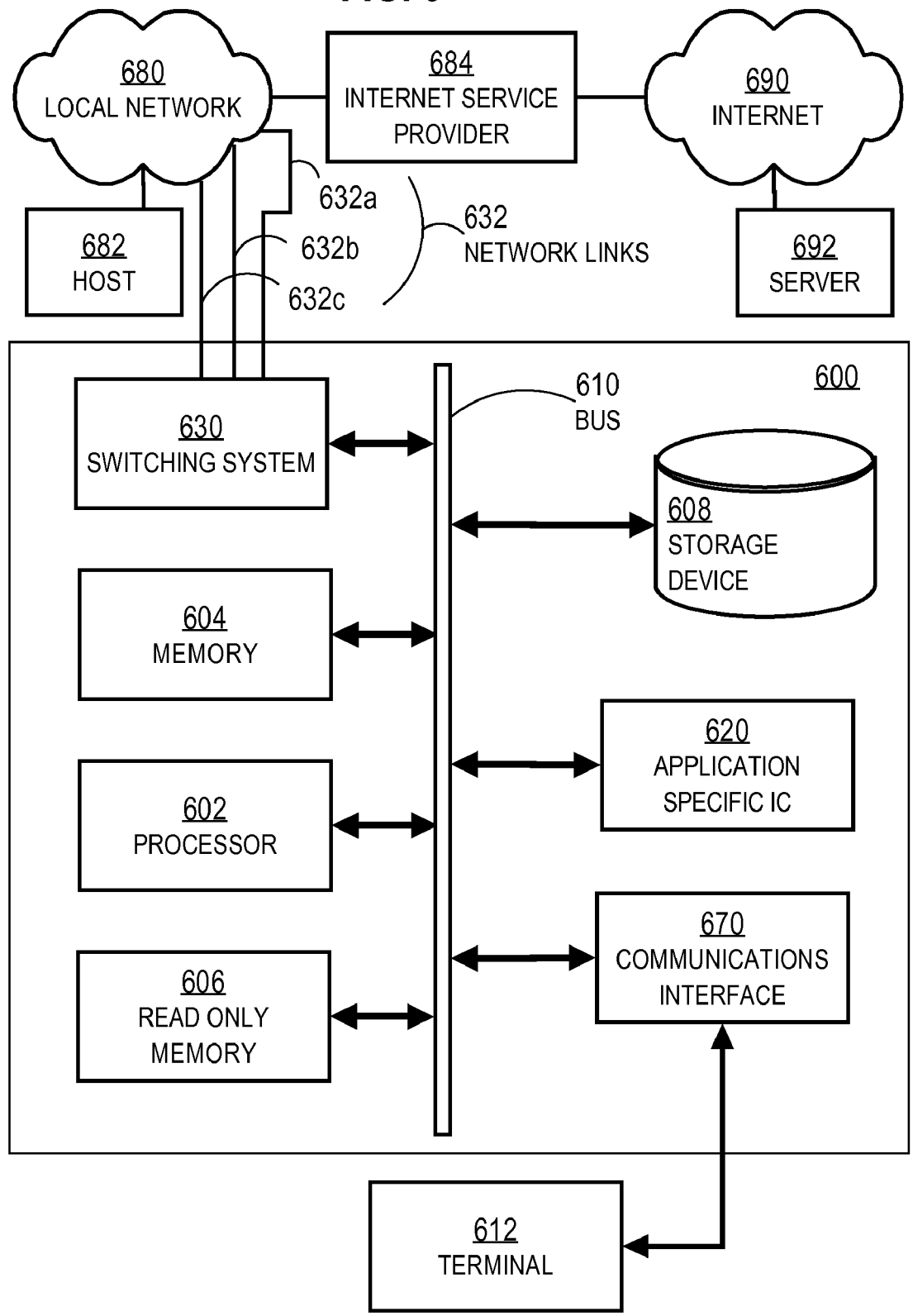

MULTI-THREADED PROCESSING USING PATH LOCKS

BACKGROUND OF THE INVENTION

1. Field of the Invention

The present invention relates to multi-threaded processing.

2. Description of the Related Art

Many processors are designed to reduce idle time by swapping multiple processing threads. A thread is a set of data contents for processor registers and memory and a sequence of instructions to operate on those contents that can be executed independently of other threads. Some instructions involve sending a request or command to another component of the device or system, such as input/output devices or one or more high valued, high-latency components that take many processor clock cycles to respond. Rather than waiting idly for the other component to respond, the processor stores the contents of the registers and the current command or commands of the current thread to local memory, thus "swapping" the thread out, also described as "switching" threads and causing the thread to "sleep." Then the contents and commands of a different sleeping thread are taken on board, so called "swapped" or "switched" onto the processor, also described as "awakening" the thread. The woken thread is then processed until another wait condition occurs. A thread-scheduler is responsible for swapping threads on or off the processor, or both, from and to local memory. Threads are widely known and used commercially, for example in operating systems for most computers.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A illustrates a method at an external thread scheduler, according to an embodiment;

FIG. 6 illustrates a computer system configured as a router for which an embodiment of the invention may be implemented.

DETAILED DESCRIPTION

Figure 1:
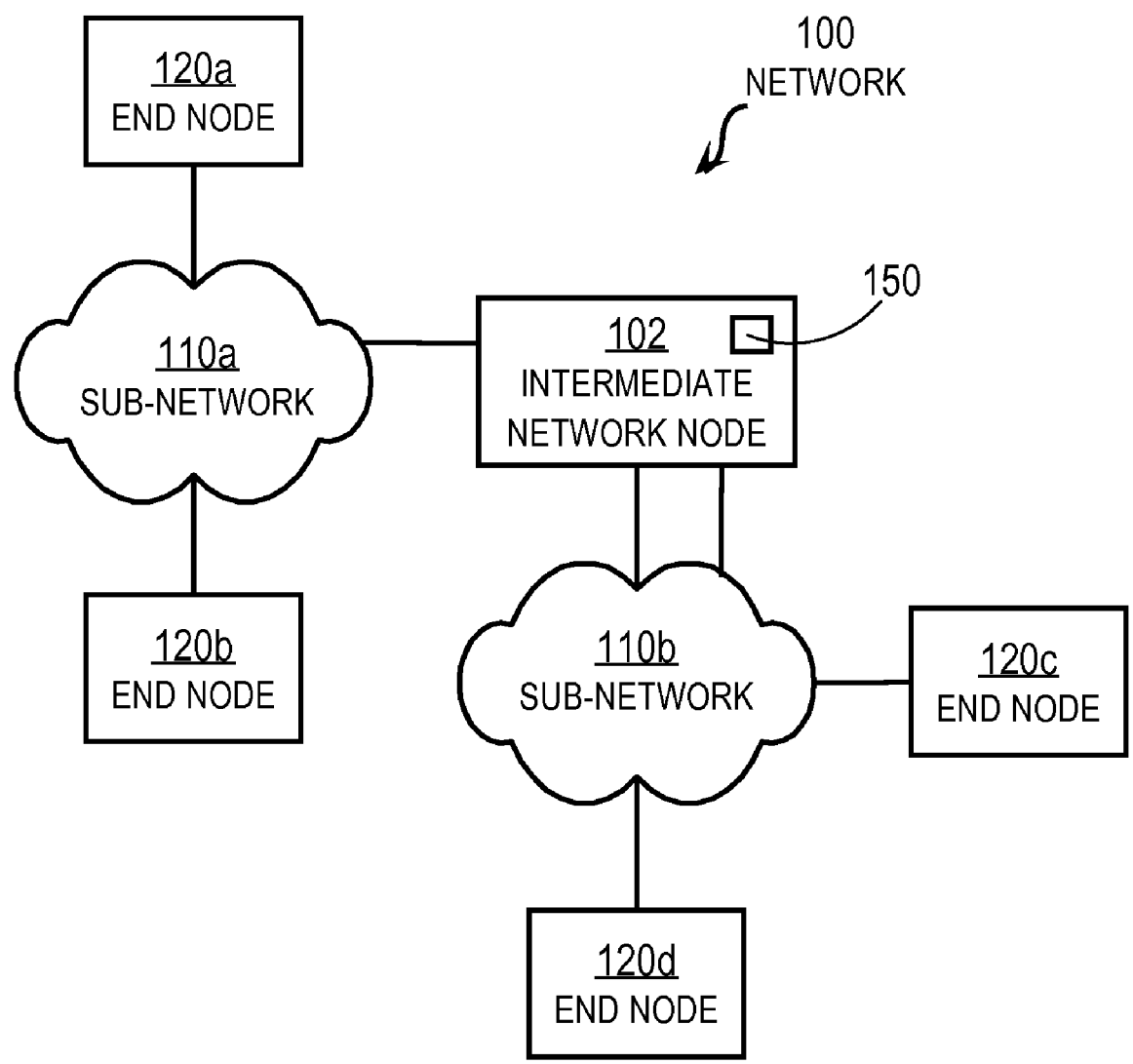
FIG. 1 illustrates a network, according to an embodiment.

Techniques are described for switching among processing threads. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 Overview

In one set of embodiments, a method includes causing all threads that access a particular portion of a shared computational resource during a particular instruction path though one or more sequences of instructions to be scheduled at a thread scheduler for a set of one or more processors. The thread scheduler receives data that indicates a first thread is to execute next the particular instruction path to access the particular portion of the shared computational resource. The thread scheduler determines whether a different second thread is exclusively eligible to execute the particular instruction path on any processor of the set to access the particular portion of the shared computational resource. If it is determined that the second thread is exclusively eligible to execute the particular instruction path, then the thread scheduler prevents the first thread from executing any instruction from the particular instruction path on any processor of the set of one or more processors.

In another set of embodiments, a method includes receiving data that indicates a unique path identifier (ID) for a particular instruction path though one or more sequences of instructions wherein a particular portion of a shared computational resource is accessed within the particular instruction path. Also received is data that indicates a processor is to execute the particular instruction path. In response to receiving data that indicates the processor is to execute the particular instruction path, switch data is sent to a thread scheduler different from the processor. The switch data indicates the processor should switch to another thread and indicates the path ID. The particular instruction path is executed to access the particular portion of the shared computational resource when the thread scheduler determines based on the path ID that no other thread is eligible to execute the particular instruction path to access the particular portion of the shared computational resource.

In some embodiments a solution for achieving near line rate processing of data packets at a router includes receiving over a first network interface a first set of one or more data packets. Data based on the first set is stored in a particular queue in a shared memory. A second set of one or more data packets to send through a different second network interface is determined based on data in the particular queue, which includes receiving, at a thread scheduler, data that indicates a first thread is to execute next a particular instruction path that includes one or more instructions to access the particular queue. It is determined whether a different second thread is exclusively eligible to execute the particular instruction path to access the particular queue on any processor scheduled by the thread scheduler. If it is determined that the second thread is exclusively eligible to execute the particular instruction path to access the particular queue, then the thread scheduler prevents the first thread from executing any instruction from the particular instruction path on any processor scheduled by the thread scheduler to access the particular queue.

In some embodiments, an apparatus performs one or more steps of the above methods. In some embodiments, a computer-readable medium stores instructions that cause a processor to perform one or more steps of the above methods.

2.0 Example Context

Some thread wait conditions result from use of a high-value, long-latency shared resource, such as expensive static random access memory (SRAM), quad data rate (QDR) SRAM, content access memory (CAM) and ternary CAM (TCAM), all components well known in the art of digital processing. For example, in a router used as an intermediate network node to facilitate the passage of data packets among end nodes, a TCAM and QDR SRAM are shared by multiple processors to parse data packets and classify them as a certain type using a certain protocol or subject to a certain routing policy or belonging to a particular stream of data packets with the same source and destination or some combination. Processing for each packet typically involves from five to seven long-latency memory operations invoking the TCAM or QDR or both. These long-latency memory operations can take about 125 clock cycles or more of a 500 MegaHertz clock (MHz, 1 MHz=$10^6$ cycles per second) that paces processor operations. The parse and classify software programs typically execute twenty to fifty instructions between issuing a request for a long-latency memory operation. A typical instruction is executed in one or two clock cycles.

Embodiments of the invention are described in detail below in the context of a data packet switching system on a router that has groups of four processors, each processor allowing up to four threads that share use of a TCAM and QDR for updating routing tables while forwarding data packets at a high speed line rate. However, the invention is not limited to this context. In various other embodiments, more or fewer groups of processors, each with more or fewer processors allow more or fewer threads to share more or fewer shared components of the same or different types in the same or different components for routers or other devices.

A desirable goal of a router is to achieve line rate processing. In line rate processing, the router processes and forwards data packets at the same rate that those data packets arrive on the router's communications links. Assuming a minimum-sized packet, a Gigabit Ethernet link line rate yields about 1.49 million data packets per second, and a 10 Gigabit Ethernet link line rate yields about 14.9 million data packets per second. A router typically includes multiple links. To achieve line rate processing, routers are configured with multiple processors. The idle time introduced by the frequent long-latency memory accesses increases the number of processors needed to support line rate processing.

FIG. 1 illustrates a network 100, according to an embodiment. A computer network is a geographically distributed collection of interconnected sub-networks (e.g., sub-networks 110a, 110b, collectively referenced hereinafter as sub-network 110) for transporting data between nodes, such as computers, personal data assistants (PDAs) and special purpose devices. A local area network (LAN) is an example of such a sub-network. The network's topology is defined by an arrangement of end nodes (e.g., end nodes 120a, 120b, 120c, 120d, collectively referenced hereinafter as end nodes 120) that communicate with one another, typically through one or more intermediate network nodes, e.g., intermediate network node 102, such as a router or switch, that facilitates routing data between end nodes 120. As used herein, an end node 120 is a node that is configured to originate or terminate communications over the network. In contrast, an intermediate network node 102 facilitates the passage of data between end nodes. Each sub-network 110 includes zero or more intermediate network nodes. Although, for purposes of illustration, intermediate network node 102 is connected by one communication link to sub-network 110a and thereby to end nodes 120a, 120b and by two communication links to sub-network 110b and end nodes 120c, 120d, in other embodiments an intermediate network node 102 may be connected to more or fewer sub-networks 110 and directly or indirectly to more or fewer end nodes 120 and directly to more other intermediate network nodes.

Information is exchanged between network nodes according to one or more of many well known, new or still developing protocols. In this context, a protocol consists of a set of rules defining how the nodes interact with each other based on information sent over the communication links. Communications between nodes are typically effected by exchanging discrete packets of data. Each data packet typically comprises 1] header information associated with a particular protocol, and 2] payload information that follows the header information and contains information to be processed independently of that particular protocol. In some protocols, the packet includes 3] trailer information following the payload and indicating the end of the payload information. The header includes information such as the source of the data packet, its destination, the length of the payload, and other properties used by the protocol. Often, the data in the payload for the particular protocol includes a header and payload for a different protocol associated with a different function at the network node.

The intermediate node (e.g., node 102) typically receives data packets and forwards the packets in accordance with predetermined routing information that is distributed among intermediate nodes in control plane data packets using a routing protocol. The intermediate network node 102 is configured to store data packets between reception and transmission, to determine a link over which to transmit a received data packet, and to transmit the data packet over that link, with or without changing the contents of one or more protocol headers.

According to some embodiments of the invention described below, the intermediate network node 102 includes groups of four processors that allow up to four threads, and includes a TCAM and QDR memory to share among those threads. The TCAM is used to store route and subscriber information so that it can be retrieved quickly based on a destination address (e.g., an Internet Protocol (IP) address or a Media Access Control (MAC) address, among others) and subscriber identifier (e.g., user name, email address, telephone number, employee number, among others). Some processes performed by the intermediate network node 102 involve exclusive access to data structures stored in these external RAM.

Some processes involve exclusive access to multiple related data structures, e.g., processes that involve hierarchical policing. In some routers, a traffic policing feature limits the transmission rate of traffic entering or leaving a node. Traffic policing can be used to allocate bandwidth between subscribers and between services to a particular subscriber to ensure all types of services are allocated a proper amount of bandwidth. Per-user and per-service policing ensure bandwidth is distributed properly between subscribers (per-user policing) and between services to a particular subscriber (per-session policing). Because these policing techniques are hierarchical in nature (bandwidth can be first policed between users or interfaces and then policed again between services to a particular user), the feature is called Hierarchical Policing. Hierarchical policing is enforced using multiple data structures for subscribers and services that relate to each other. As a consequence, exclusive access is needed for both a child data structure and a parent data structure. For example, a logical or physical port at a network interface interface has a hard bandwidth limit that is described in a parent data structure. Multiple children data structures are used to divide up or allocate the bandwidth based on quality of service (QoS) or priority. If a high priority voice packet is received, for instance, it is ensured that the bandwidth for this type of traffic is not exceeded by checking the child structure that contains the current consumed bandwidth for this type of service and the max bandwidth for this type of service. If this child check is passed, then the parent is checked to ensure that the overall bandwidth for the port or interface is not exceeded.

According to the illustrated embodiments of the invention, a data processing system, such as the intermediate network node 102, includes a modified mechanism 150 for switching threads on each of one or more processors. Such a mechanism 150 makes line rate performance at the router more likely. In mechanism 150, portions of instruction sets executed by processors that access a particular portion of shared components are indicated by path identifiers (path IDs) and a thread scheduler allows only one thread to execute instructions associated with that path ID. This mechanism 150 eliminates the need for locks on the long-latency components and reduces the number of thread switches in hierarchical policing and other processes involving multiple related access to shared computational resources, as described below. The modified mechanism 150 allows a conventional single or multi-threaded processor to use long-latency computational components without incurring the same lock overhead and delays as prior approaches. Thus line rate processing of data packets is more easily achieved.

3.0 Structural Overview

Conventional elements of a router which may serve as the intermediate network node 102 in some embodiments are described in greater detail in a later section with reference to FIG. 6. At this juncture, it is sufficient to note that the router 600 includes one or more general purpose processors 602 (i.e., central processing units, CPUs), a main memory 604 and a switching system 630 connected to multiple network links 632, and a data bus 610 connecting the various components. According to some embodiments of the invention, a general purpose processor 602 is modified as described in this section. In some embodiments, one or more processors (not shown) on switching system 630 are so modified.

Figure 2:
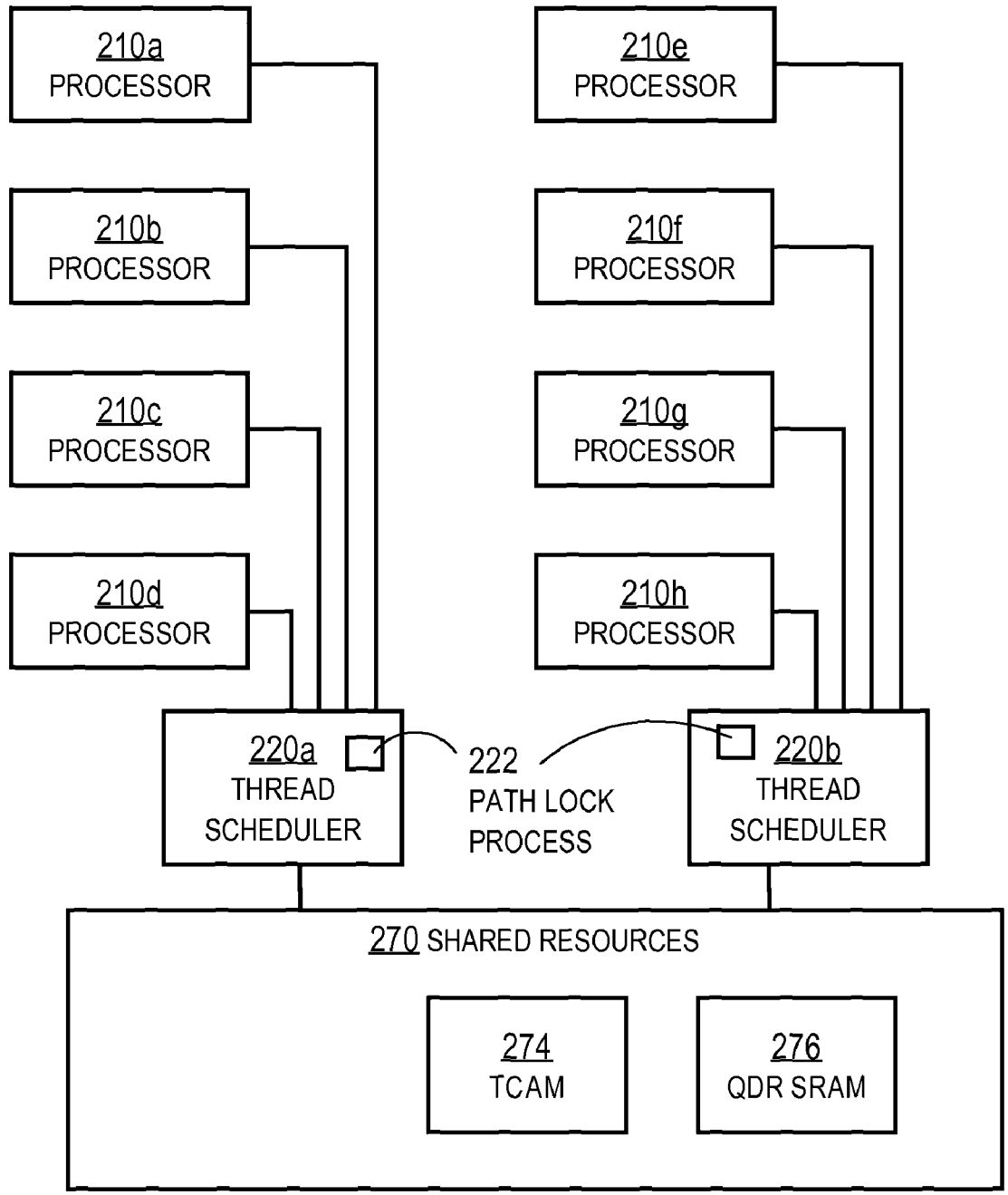
FIG. 2 illustrates a multi-processor system in a router, according to an embodiment.

FIG. 2 illustrates a multi-processor system in a router 200. The router 200 includes eight processors 210a, 210b, 210c, 210d, 210e, 210f, 210g, 210h (collectively referenced hereinafter as processors 210) connected four at a time to external thread schedulers 220a, 220b (collectively referenced hereinafter as thread scheduler 220), respectively. The router 200 also includes a shared resources block 270. Data is passed between the processors 210 and the shared resources block 270 through the thread scheduler 220. The shared resources block 270 includes one or more shared resources. In the illustrated embodiment, the shared resources include a TCAM 274 and a QDR SRAM 276. In other embodiments, more or fewer groups of processors connect to each of more or fewer thread schedulers which are connected to a shared resources block 270. Each thread scheduler includes a path lock process 222, described in more detail below.

Figure 3A:
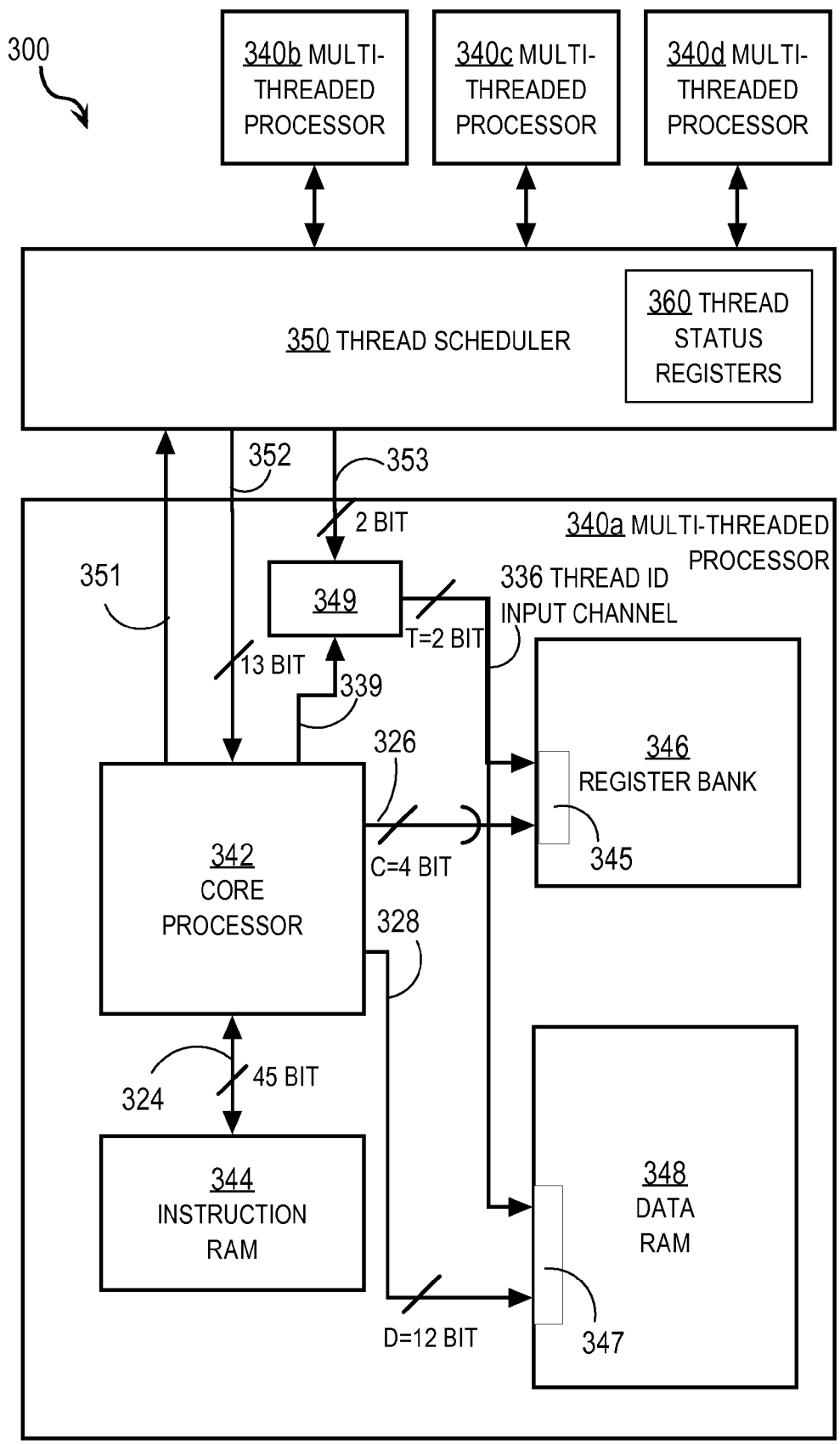
FIG. 3A illustrates an apparatus with external thread scheduler and a multi-threaded processor, according to an embodiment.

FIG. 3A illustrates a multi-threaded processor 340a that is used as processor 210a in some embodiments. In the illustrated embodiment, processors 340b, 340c, 340d are used as processors 210b, 210c, 210d, respectively. Processors 340a, 340b, 340c, 340d are collectively referenced hereinafter as multithreaded processors 340. The treads executing on multi-threaded processors 340 are controlled by thread scheduler 350

The processor 340a includes a core processor 342, an instruction random access memory (IRAM) 344, a register bank 346 and a data RAM 348. These components are connected by data channels that are sets of parallel wires that each carries a voltage indicating a value of a single bit of information. The number of parallel wires in the channel is the bit width of the channel and is proportional to the number of bits that can be transferred during one clock cycle. The data channels include core-IRAM channel 324, core-register access channel 326 and core-data RAM access channel 328.

The core processor 342 is a circuitry block that implements logic to execute coded instructions. Input and output to the core processor are effected through leads that are exposed on the outside of the core processor. A data channel connects certain leads on the core processor 342 to leads that serve as input and output on other blocks of circuitry. The IRAM 344 is a circuitry block that supports random access memory read and write operations. In some embodiments, IRAM 344 is read only memory and supports only read operations for retrieving IRAM contents. The register bank 346 is a circuitry block that supports random access memory read and write operations for a set of memory locations that are easily addressed by a few bits in the instructions retrieved from IRAM. The register bank 346 has $2^C$ addressable locations for each thread=$2^T \times 2^C$ addressable locations, where T=number of bits to specify the maximum number of threads allowed by processor 340a. In the illustrated embodiment T=2 and C=4 so that register bank 346 has $2^2 \times 2^4 = 4 \times 16$ addressable locations. The data RAM 348 is a circuitry block that supports random access memory read and write operations for a larger set of memory locations. The data RAM 348 serves as a fast local storage for data used by the current thread. An instruction typically involves moving the contents of one location to or from a register in register bank 346. The data RAM 348 has $2^T \times 2^D$ addressable locations. In the illustrated embodiment D=12 so that register bank 346 has $4 \times 2^{12} = 4 \times 4096$ addressable locations. In some other available processors 340 one or more of T, C and D are equal to different values. At each addressable location in register 346 and data RAM 348, 64 bits of content are stored.

The core processor 342 uses some leads connected to core-IRAM channel 324 to retrieve a next instruction from IRAM 344. In the illustrated embodiment, the core-IRAM channel 324 has a width of 45 bits, i.e., includes 45 parallel wires that connect leads on the core processor 342 to leads on the IRAM 344. On the 45 bit core-IRAM channel 324, 13 bits are used to express a location in the IRAM from which an instruction is to be retrieved, and 32 bits are used to indicate the instruction retrieved. The instruction typically includes data that indicates an address for one or more registers in register bank 346 or an address for a location in data RAM 348. The address of a register is expressed by a value made up of C bits, while an address for a location in the data RAM is expressed by a value made up of D bits. In the illustrated embodiment, C=4 and D=12; in some other processors one or more of C and D are equal to different numbers of bits. After the instruction is retrieved, it is executed and the result is indicated on leads of the core processor specified by the instruction.

Some leads on core processor 342 are connected to a core-register channel to get or put contents for a particular register in register bank 346. The core-register channel includes a C bit core-register access channel 326 to indicate a particular register and a wider channel (not shown) to hold the contents. The core-register access channel 326 is connected to a bank input 345 comprising T+C leads. In the illustrated embodiment, C=4 bits, and the wider channel (not shown) is 64 bits wide.

Similarly, some leads are connected to a core-data RAM channel to get or put contents for a particular location in data RAM 348. In an illustrated embodiment, the core-data RAM channel includes a D=12 bit core-data RAM access channel 328 to indicate a particular location and a 64 bit channel (not shown) to hold the contents. The core-data RAM access channel 328 is connected to a data RAM input 347 comprising T+D leads.

Some instructions involve using still other leads (not shown) to send a request to off-processor elements, such as shared resources 270, using other data channels (not shown).

In some approaches to using processor 340 for multiple threads, a thread scheduler application executes on core processor 342 and determines when to switch threads. When a thread is to be switched, the thread scheduler application swaps register bank 346 and, sometimes, data RAM 348 used by the current thread with the contents for those elements of a different thread, which contents are stored on some more distant memory. This approach for switching threads consumes many clock cycles in the process. Also the thread scheduling application itself consumes some of the space on IRAM 344, register bank 346 and data RAM 348, leaving less of that space for the threads themselves.

According to the illustrated embodiments, the core processor 342 continues to access registers, data RAM locations and IRAM locations as if these components were of a size only for a single thread, using the same leads and data channels as in other approaches. However, in these embodiments, one or more large components are used to store contents for all threads that may share the core processor. Contents for different threads are stored in different portions of the large components (also called slices or windows of the large components). The different portions are indicated by additional bits in the address inputs, and those bits are provided by an external thread scheduler as a unique thread ID for the current thread to be executed by the core processor. A unique thread ID of T bits is associated with each thread of the up to $2^T$ threads allowed to share core processor 342. Thus, during thread switching, only the value of the bits supplied by the external thread scheduler change, and contents of the register bank, data RAM and IRAM need not be swapped. This approach reduces the work load during thread switching and significantly reduces the number of clock cycles consumed to complete the switch.

When a blocked thread scheme is used to determine when to switch threads, additional savings can be achieved. In a blocked thread system, a thread executes on a processor until the thread determines that it should relinquish the processor to another thread and issues a switch thread command. The thread scheduler determines which of the sleeping threads, if any, to awaken and execute on the processor after the switch. It is further assumed, for purposes of illustration that a thread relinquishes control of the processor after issuing a request for a long-latency memory operation.

Apparatus 300 includes an external thread scheduler 350. The apparatus is configured to switch among up to $2^T$ processing threads on each processor 430 connected to thread scheduler 350. In an illustrated embodiment, T=2 so that up to four threads are allowed to share each processor 340. In various other embodiments, the value of T is greater than or less than 2.

A particular register in register bank 346 is accessed by a particular value placed on the leads in bank input 345. Bank input 345 includes T leads more than the number of wires in channel 326. Data RAM input 347 includes T leads more than the number of wires in channel 328. Thus in the illustrated embodiment bank input 345 involves 6 leads and data RAM input 347 involves 14 leads.

The apparatus 300 includes thread scheduler 350, flip-flop register 349, and data channels 351, 352, 353, 336 and 339 connecting them to each other and to the other components of processor 340a. Similar channels are indicated by the two way connections between thread scheduler 350 and the other processors 340b, 340c, 340d. The external thread scheduler 350 is a circuitry block with logic to receive information from the core processor 342 about a current thread when the thread is to be switched, and determine which of the other threads, if any, is eligible to be awakened and next take possession of the core processor 342. Any method may be implemented in thread scheduler 350 to determine whether a thread is eligible and to ensure that no conflicts occur during exclusive use of a shared resource 270. An illustrated embodiment is described in more detail in a following section. If no thread is eligible, then a default idle thread is selected by the thread scheduler 350. If several threads are eligible, the external thread scheduler 350 arbitrates to select one of the eligible threads.

The thread scheduler 350 includes thread status registers 360 where information is stored about each of up to $2^M \times 2^T$ threads for the $2^T$ threads for each of the $2^M$ processors 340. In the illustrated embodiments M=2 to indicate four processors. The information in the thread status registers 360 is used by the external thread scheduler 350 to determine the eligibility, priority, and activity of the threads that share core processor 342 on multi-threaded processors 340. The thread status registers 360 are described in more detail below with reference to FIG. 3B.

A switch preparation channel 351 is wide enough to transfer, from leads on the core processor 342 to leads on the external thread scheduler 350, the location in the IRAM for the next instruction of the current thread to be executed when the current thread is revived at some later time. In an illustrated embodiment, the switch preparation channel is 15 bits (13 bits for IRAM address, 1 bit to indicate whether the thread is done or retired, and 1 bit to indicate priority when thread is revived). In other embodiments more or fewer bits are included. A thread instruction channel 352 is wide enough to transfer, from leads on the thread scheduler 350 to leads on the core processor 342, a location in the IRAM for the next instruction of the reviving next thread. In the illustrated embodiment, the thread instruction channel 352 is 13 bits wide. A thread ID load channel 353 is T bits wide to provide the thread ID for the next thread used as the additional T bits in the bank input 345 and data RAM input 347.

In the illustrated embodiment, the thread ID load channel 353 connects leads on the thread scheduler 350 to leads on the flip-flop register 349. When the thread switch signal is received at the flip-flop register 349, the thread ID is registered and stored by the flip-flop register on the leads connected to a thread ID input channel 336. The thread ID input channel 336 connects the flip-flop register 349 to T leads of the bank input 345 and T leads of the data RAM input 347. The thread switch signal is received at the flip-flop register 349 from the core processor 342 on a thread switch output channel 339. In the illustrated embodiment, the switch output channel 339 is 1 bit wide.

The value on the T additional leads in register bank input 345 and data RAM input 347 are provided on thread ID input channel 336. In an example embodiment, the thread ID input channel 336 is connected to the T leads of the inputs 345 and 347 that correspond to the most significant bits. However, the invention is not limited to this choice. In other embodiments any T leads of inputs 345 and 347 are connected to the thread ID input channel 336, as long as none of those T leads are the same as the C leads connected to core-register access channel 326 or the D leads connected to core-data RAM access channel 328.

In embodiments in which different threads use different instructions, then the thread ID input channel 336 also connects to one or more bits for an input for an enlarged IRAM (not shown). In the illustrated embodiment, all threads execute the same software stored in IRAM 344.

Figure 3B:
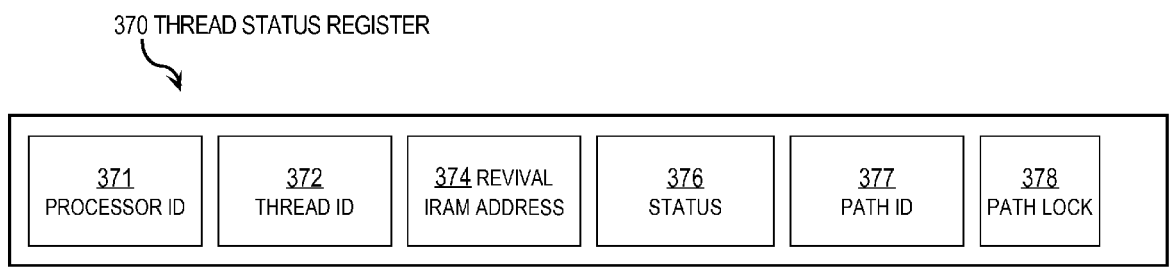
FIG. 3B illustrates a thread status register for the external thread scheduler, according to an embodiment.

FIG. 3B illustrates a thread status register 370 for the thread status registers 360 in the external thread scheduler 350, according to an embodiment. In the illustrated embodiment, the register 370 includes for one thread a processor ID field 371, thread ID field 372, a revival IRAM address field 374, a status field 376, a Path ID field 377 and a Path Lock field 378.

The processor ID field 371 holds M bits that uniquely identify each processor controlled by the thread scheduler 350. In the illustrated embodiment M=2 to indicate one of four processors controlled by the thread scheduler 350; and the processor ID field 371 is 2 bits in size. The thread ID field holds T bits that uniquely identify each thread that shares use of core processor 342 on the corresponding processor indicated in processor ID field 371. In the illustrated embodiment, the thread ID field 372 is 2 bits in size. The revival IRAM address field 374 holds data that indicates a location in IRAM 244 where the instruction resides that is to be executed next when the thread identified in the thread ID field 372 is switched back onto the core processor 342. In the illustrated embodiment, the revival IRAM address field 374 is 13 bits in size. The status field 376 holds data that indicates a status of the thread identified in the thread ID field 372. In the illustrated embodiment, the status field is 4 bits. Three bits are used to indicate thread state: (001) Idle, (010) Waiting for responses, (011) Ready, (100) Running, (000) Retired or complete. One bit is used to indicate priority.

The path ID field 377 holds P bits that uniquely identify a path through an instruction set that exclusively accesses a portion of a shared computational resource. Any method may be used to define the path ID, as described in more detail below. In the illustrated embodiment, P=16 bits, and a zero value for this field indicates that a thread is not requesting a path lock. The Path Lock field 378 (also called a Path Lock flag,) holds L bits that uniquely indicate whether the thread associated with register 370 is exclusively eligible to execute the path through the instruction set indicated by the path ID in the Path ID field 377. According to the illustrated embodiments, only one thread associated with a particular path ID is granted exclusive eligibility to execute. As is shown in examples described below, this reduces the number of thread switches and alleviates a need for locks on the shared resource, thus prevents threads that are not running from holding locks on a resource.

Although fields 371, 372, 374, 376, 377, 378 are shown as contiguous portions of an integral register 370 in the illustrated embodiment for purposes of illustration, in various other embodiments one or more fields or other portions of register 370 are stored as more or fewer fields in the same or more registers on or near the thread scheduler 350. In some embodiments, additional fields are included in the thread status register 370, or associated with the thread having the thread ID in field 372. For example, in some embodiments a priority field indicates a priority for the thread and an age rank field indicates how many threads preceded the thread in being switched off the core processor 342. In some embodiments another field with more than T bits is used as a thread descriptor in addition to the thread ID in thread ID field 372.

Figure 3C:
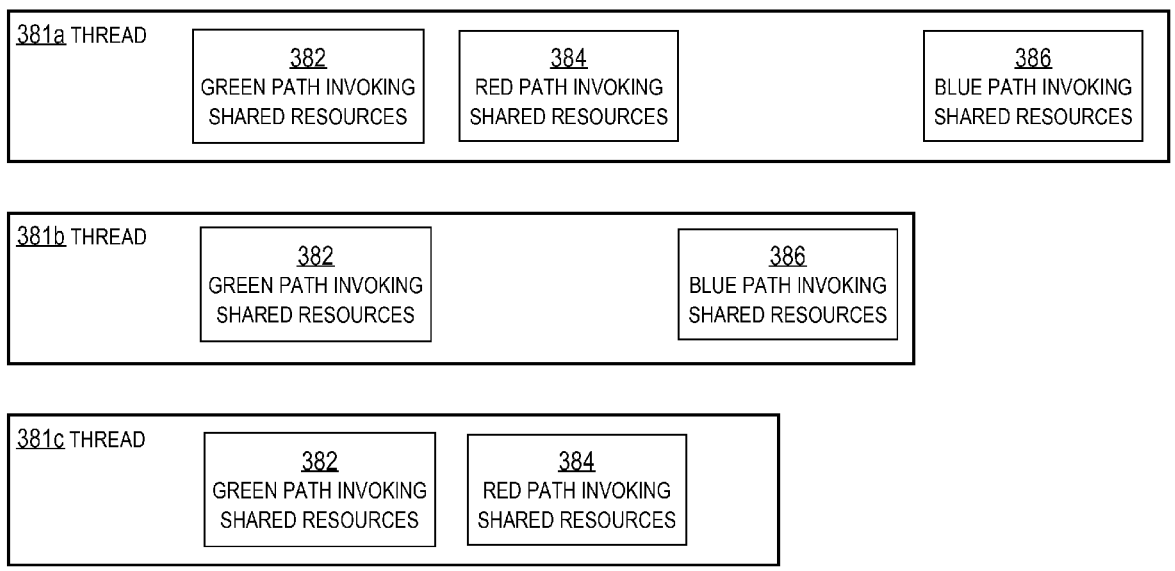
FIG. 3C illustrates example sequences of instructions executed by different threads, according to an embodiment.

The instructions in IRAM 344 include some instructions that involve access to the shared resources 270. Each thread progresses through the instruction set in the IRAM but may take different paths depending on branch points encoded in the instruction set and conditions at the time of execution. FIG 3C illustrates example sequences of instructions 380 executed by different threads, according to an embodiment. Three threads 381a, 381b, 381c are shown. Each threads executes, in sequence, some or all portions of instructions from the instruction set in IRAM 344. Certain groups of instructions involve exclusive access to one or more of the shared resources 270. A group of instructions that exclusively access one or more shared resources is called an exclusive access path. The instruction set may include one or more exclusive access paths. Each thread executes zero or more of the exclusive access paths.

It is assumed for purposes of illustration that the instruction set in IRAM 344 includes three exclusive access paths, designated herein as a green path 382, a red path 384 and a blue path 386. It is further assumed that thread 381a executes all three exclusive access paths in order, interspersed among one or more other instructions sets that do not involve exclusive access to a shared resource. It is further assumed that, because of branch points in the instruction set of IRAM 344 and different conditions encountered by different threads, that thread 381b executes green path 382 and blue path 386 but not red path 384. Similarly, thread 381c executes green path 382 and red path 384 but not blue path 386.

The exclusive access paths include one or more instructions to access the shared resources. For, example, with hierarchical policing, an exclusive access is made to a child data structure followed by an exclusive access to a parent structure. For purposes of illustration, it is assumed that green path 382 includes the following pseudo instructions (Pseudo Code 1) among zero or more other instructions to the next branch point.

---
Read Child Structure
Compute Parent Address
Read Parent Structure
Determine Change to Child Structure
Update Child Structure
Determine Change to Parent Structure
Update Parent Structure

---

It is noted that under prior approaches, in order to assure exclusive access to the parent and child structures, a lock mechanism is included for the shared resourced 270, and the instruction set must include a request to obtain a lock on the child and parent structures. The extra steps are indicated by the following pseudo instructions (Pseudo Code 2), with the extra instructions in bold.

---
Lock Child Structure
Read Child Structure
Compute Parent Address
Lock Parent Structure
Read Parent Structure
Determine Change to Child Structure
Update Child Structure
Determine Change to Parent Structure
Update Parent Structure
Release Lock on Child Structure
Release Lock on Child Structure

---

When performing line rate features, the overhead associated with acquiring locks may be expensive. Furthermore, in a multi-threaded, multiprocessor system, a thread could be granted a lock while it is not running and may hold the lock for and extended time while one or more other threads execute until giving up control, in succession. Other threads that attempt to access the locked portion of the resource are thus delayed as a thread that is NOT RUNNING holds a lock on that portion of the resource.

It is further noted that under prior approaches, when the structures are stored in high-latency resources, such as TCAM and QDR SRAM, a thread is switched after each lock request and data access so that the processor is not idle while the response is obtained from the shared resource. In such an approach, the path includes thread switch instructions to alert the processor and thread scheduler that the thread should be switched off the processor until a response is received from a long latency resource. The further additional steps are indicated by the following pseudo instructions (Pseudo Code 3), with the further additional instructions in bold.

---

Lock Child Structure
Thread Switch
Read Child Structure
Thread Switch
Compute Parent Address
Lock Parent Structure
Thread Switch
Read Parent Structure
Thread Switch
Determine Change to Child Structure
Update Child Structure
Determine Change to Parent Structure
Update Parent Structure
Release Lock on Child Structure
Release Lock on Child Structure
. . .
Thread Switch

---

Each thread switch also incurs some cost in computational resources. It is desirable to reduce the number of locks and thread switches shown in Pseudo Code 3 to accomplish the kind of hierarchical policing indicated by Pseudo Code 1.

According to the illustrated embodiments, the exclusive access path (e.g., the green path 382) is labeled with a unique Path identifier (Path ID), and the thread scheduler ensures that only one thread is allowed to execute instructions for any one Path ID. This approach may eliminate the need for locks on the shared resource and also may reduce the number of thread switches, as described in more detail in the following sections.

4.0 Method at Core Processor

Figure 4:
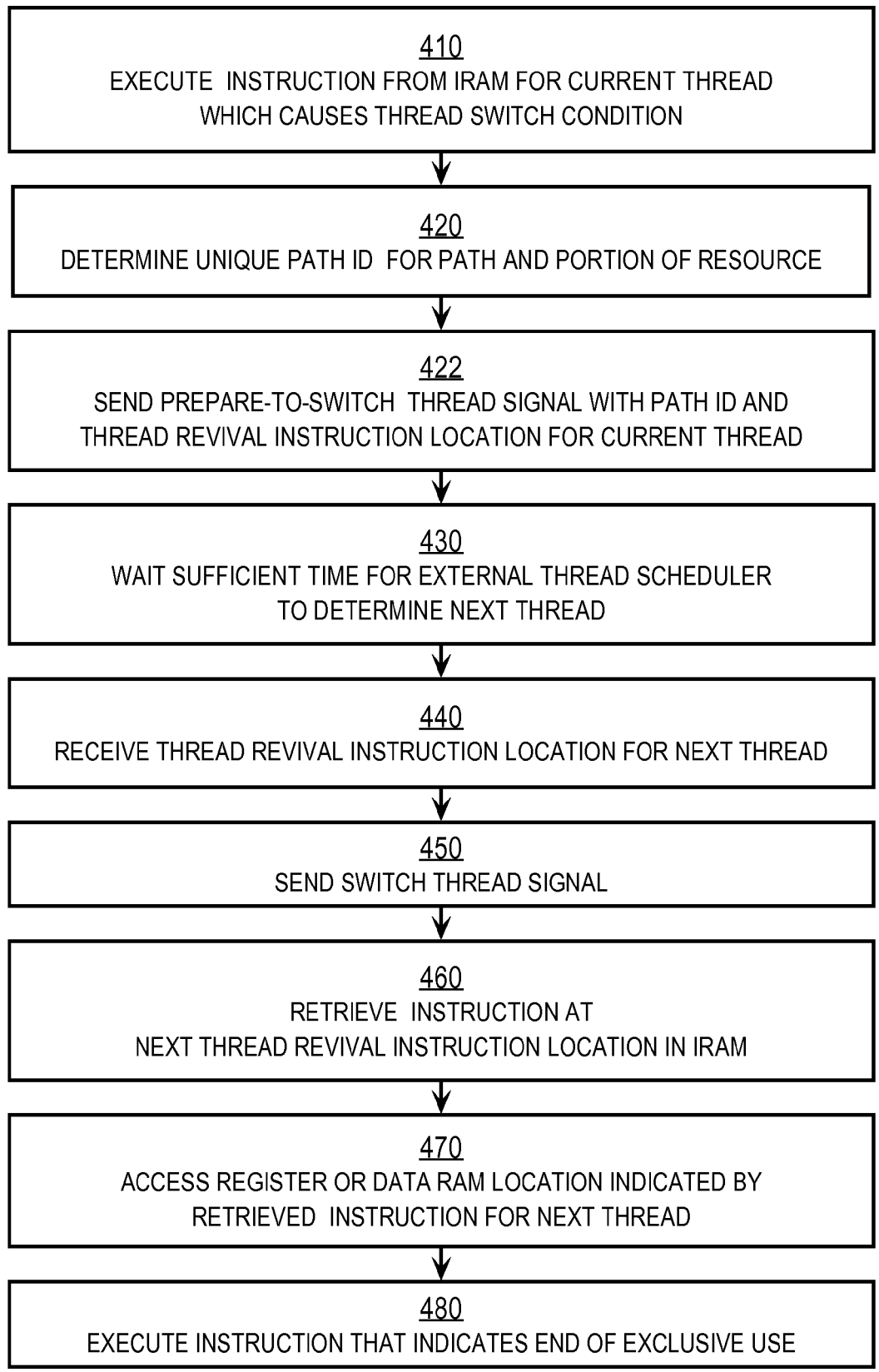
FIG. 4 illustrates a method programmed on the processor, according to an embodiment using a thread scheduler.

FIG. 4 illustrates a method 400 programmed on the core processor, according to an embodiment using an external thread scheduler. Although steps are shown in FIG. 4 and subsequent flow diagrams (FIG. 5A and FIG. 5B) in a particular order for purposes of illustration, in other embodiments one or more steps are performed in a different order or overlapping in time, or one or more steps are omitted, or the method is changed in some combination of ways.

In step 410, the core processor executes an instruction retrieved from the IRAM, which causes a thread switch condition. For example, the instruction is associated with the termination of a set of instructions that precede an exclusive access path (e.g., the green path 382) of the instruction set. The programmer who wrote these instructions knows that after one or more such operations, the thread should switch off the core processor and so recognizes that the instruction causes a thread switch condition. In some embodiments, an interpreter or compiler recognizes the switch condition automatically.

In step 420 a unique Path ID is determined for the sequence of instructions to be executed when control is returned to the thread. If the sequence of instructions to be executed upon returning control to the thread does not involve exclusive access to a shared resource, then the unique path ID is a default value, e.g., a null value, such as 16 zero bits (0000000000000000). If the sequence of instructions to be executed upon returning control to the thread does involve exclusive access to a portion of a shared resource, then the unique Path ID is not null, but is a value that is unique among the sequence of instructions that operate on a particular portion of the shared resource.

For example, the green path is uniquely indicated by a label, e.g., four-bit exclusive path 1 (binary 0001). If the green path refers to the same portion of the shared resource for all execution of the green path, regardless of the data, then the Green ID itself is sufficient as the Path ID (e.g., four bits equal to the Green Path Label followed by twelve bits of zeros (0001000000000000) designated GREEN ID, hereinafter. If the green path involves to different portions of the shared resource on different executions of the green path, then, in some embodiments, the path ID may also depend on the data. For example, if the green path in thread 281*a* is for record 107 (binary 1101011) in the child structure of Pseudo Code 1 in the shared resource, then a unique Path ID may be defined by four bits equal to the indicating the green path (0001) followed by twelve bits that correspond to the record number of the child data structure in the shared resource (0001000001101011), designated GREEN-107 ID hereinafter. Since this child has a unique parent data structure, the Path ID is unique for both the child and the parent accessed by the green path portion of the sequence of instructions in the thread. If exclusive access is needed for both child and parent for multiple children with the same parent, then the value for the path lock ID is constructed such that all siblings (related children) request the same path lock ID. In some embodiments, all portions of the instruction set that make exclusive access to the subscriber record 107 are considered the same exclusive access path and get the same Path ID. A separate instruction path label need not be added. For example, all sections of code that involve exclusive access to subscriber record 107, with or without its parent record, are given the same path ID based on that record number, e.g. the GREEN-107 ID (0001000001101011, binary).

The programmer who wrote these instructions knows the section of code executed between thread shifts that invokes exclusive access to this record, with or without its parent record, should receive a unique Path ID. In some embodiments, an interpreter or compiler recognizes the exclusive access condition and assigns the path ID automatically. For example, a function is called that determines a Path ID based on a function call and a record to be accessed. For example, the following C language statement is used.

vpid=get_vpid(vqid, function_id)

where vpid is a variable that holds data that indicates the unique path ID (e.g., GREEN-107 ID=0001000001101011, binary. In this statement, function_id is a variable that holds data that indicates the function call that involves exclusive access to a shared resource, e.g., hierarchical policing as in the green path. In this statement, vqid is a variable that holds data that indicates the portion of the shared resource on which the function operates, e.g., the record of a data structure, or the queue of data packets operated upon by a particular thread.

In step 422, a prepare-to-switch signal is sent. The prepare-to-switch signal includes data that indicates both the Path ID and the next instruction to execute when the thread is switched back onto the core processor and resumes processing. In addition, the prepare-to-switch signal includes data that indicates whether or not the current thread has completed processing (retired), or, if not retired, the priority of the thread when it is revived. For example, the following C language statements are used to generate the core processor instructions for thread 381*a*.

```
path_m:
    ...
    prepare_to_switch (path_n, vpid);
    ...
    next_thread = switch_thread();
    jump next_thread;
path_n:
    ...
    call function indicated by function_id
    ...
    call release_plock(vpid)
```

At the end of the C statements indicated by the first ellipsis, conditions are satisfied for executing path n to invoke exclusive access to a shared resource by calling the function indicated by funciton_id. The statements through jump next_thread are executed before the current thread is switched off the processor. When the current thread is switched back on, the next instruction is generated by the C statement at the label path_n. Therefore, the prepare_to_switch statement includes as an argument the path_n label. The compiler or interpreter, as is well known in the art, translates the C language label path_n to a processing instruction address in the IRAM.

In step 430, the processor waits sufficient time for the external thread scheduler 350 to determine the next thread. It is assumed for purposes of illustration that 6 cycles of a 500 MHz clock is sufficient for the external thread scheduler 350 to determine the next thread and to send the thread ID for the next thread to flip-flop register 349 over thread ID load channel 353. In the illustrated embodiment, the second ellipsis in the C language statements above stands for one or more statements that enforce this wait. Any instructions that have the desired effect may be used.

In step 440, a thread revival instruction location for the next thread (e.g., thread 381*b*) is received. During the waiting time interval of step 430, the external thread scheduler 350 sends a location in IRAM 344 for an instruction for the next thread (e.g., thread 381*b*) to the core processor through thread instruction channel 352. In the illustrated embodiment, thread revival instruction location for the next thread is received, from the external thread scheduler 350, at leads on the core processor 342 connected to thread instruction channel 352.

In step 450, switch thread signal is sent. For example, a 1 bit signal is sent from core processor 342 through switch output channel 339 to the flip-flop register 349. As a result, the T bits that identify the next thread are placed on the thread ID input channel 336 by the flip-flop register 349. As a consequence, the portion of the register bank 346 and data RAM 348 associated with the next thread will be accessed as a result of subsequent addresses placed on core-register access channel 326 and core-data RAM access channel 328, respectively, by core processor 342.

In the illustrated embodiment, steps 440 and 450 are performed by the C language statement next_thread=switch_thread( ). The routine call switch_thread( ) causes the switch signal to be sent for step 450, and the routine switch_thread( ) returns a value of the IRAM location received over channel 352. That IRAM location is stored in the C language variable next_thread.

In step 460, the instruction at the IRAM location for the next thread is retrieved and executed. For example, the C language statement jump next_thread retrieves and executes the instruction at the IRAM location stored in the C language variable next_thread.

In step 470 a register or data RAM location indicated in a retrieved instruction is accessed by the core processor using the C bits on channel 326 or D bits on channel 328, respectively, and relying on the T bits from channel 336 to indicate the appropriate portion of the register bank and data RAM, respectively.

When the external thread scheduler 350 determines that the thread 381*a* is eligible to run again, then the instruction corresponding to path n in thread 381*a* is received in step 440, and control resumes at that instruction in step 470 after the switch thread signal is sent in step 450, e.g., by thread 381*b*.

In step 480 an instruction is executed that indicates end of exclusive use of shared resources by a path with a path ID, if any. For example, path n includes partway down or at its end a function call that causes a signal to be sent to the thread scheduler indicating that exclusive use of the portion of the shared resource is completed and another thread can begin executing a thread with the same Path ID. In the illustrated embodiment, this function call is indicated in the C language statement call release_plock(vpid). In some embodiments, step 480 is omitted; and the exclusive use is assumed completed by the thread scheduler when the same thread switches to a path with a different Path ID (or no Path ID).

5.0 Method at Thread Scheduler

In this section is described a method used on external thread scheduler 350 to interact with the components of the apparatus 300. For the illustrated embodiment, it is noted that exclusive use of data structures in a shared resource is only needed when processing network data packets from the same physical port or virtual queue on a physical port, because data from a different physical port or virtual queue are stored in different data structures on the shared resource. All the threads on all processors devoted to that physical port or virtual queue should be controlled by the same thread scheduler. For example, if processors 210*a*, 210*b*, 210*c*, 210*d* and no others are devoted to processing data for a particular network interface on a router, then thread scheduler 220*a* can guarantee exclusive access to portions of the data structures for this physical network interface without resorting to additional lock mechanisms for the shared resources 270. In other embodiments, more or fewer processors or threads are grouped for control by a particular thread scheduler to guarantee exclusive access to portions of a shared resource.

FIG. 5A illustrates a method at an external thread scheduler, according to an embodiment. In step 510 a prepare-to-switch signal is received from the core processor 342. The prepare-to-switch signal includes data that indicates a Path ID and an IRAM location where resides an instruction to execute when the current thread is revived to switch back onto core processor 342. For example, a signal is received on thread preparation channel 351 that includes a IRAM location associated with the C language path_n label. It is assumed for purposes of illustration that the path_n label is associated with the 13 bit IRAM location 1000110001100 (binary). It is further assumed for purposes of illustration that the path ID is GREEN-107 ID associated with the green path 382 operating on record 107. As described above, the prepare-to-switch signal includes data that indicates whether the thread is done, retired, or complete as well as priority when revived.

In step 514, the IRAM location for the thread revival instruction and the path ID are stored in the thread status registers 360 in associations with a thread ID for the current thread and a processor ID for the processor on which the current thread is executing. For example, if the thread ID of the current thread is 10 (binary) operating on processor 210*a* (binary 01) for thread scheduler 220*a*, then the IRAM location is stored in the revival IRAM address field 374 in the thread status register 370 of scheduler 220a where the processor ID field 371 includes the value 01 (binary) and the thread ID field 372 includes the value 10 (binary). Also stored in the same register in the Path ID field 377 is the value 0001000001101011 for GREEN-107 ID.

In some embodiments a value is inserted in the Path Lock field 378 that indicates a lock is not granted. In some embodiments, the Path Lock field 378 is a one bit field; and a value of zero indicates a lock has not been granted and a value of 1 indicates a lock has been granted. The Path Lock field 378 is initialized with a value that indicates a lock is not granted, when a new thread is entered into the thread status register 370. In some embodiments, a value is inserted in the Path Lock field 378 that indicates a lock is not granted with every thread switch. In some embodiments, a value is inserted in the Path Lock field 378 that indicates a lock is not granted only when a new or different Path ID is inserted into the Path ID field. In the latter embodiments, a lock already obtained for the Path ID for this thread is retained across multiple thread switched within the same exclusive path, e.g., for hierarchical policing.

It is further assumed for purposes of illustration that a value is also stored in the status field 376 for the same register, which indicates that the thread is active and data eligible because no data has yet been requested.

In step 520, the external thread scheduler 350 (e.g., 220a) determines the next thread in response to receiving the prepare-to-switch signal. As described above, any method may be used that ensures no two threads are eligible to exclusively use the same Path ID. Step 520 according to a particular embodiment 521 is described below with reference to FIG. 5B.

In step 580, the thread ID for the next thread is sent to determine the portion of the register bank and data RAM reserved for the next thread. For purposes of illustration, it is assumed that thread 381a is determined to be the next thread in step 520. For example, the two bit thread ID 10 is sent to the flip-flop register 349 over thread ID load channel 353 to indicated thread 381a. When a switch thread signal is later received at flip-flop register 349, the two bits 10 will be provided over thread ID input channel 336 to the register bank input 345 and data RAM input 347.

In step 582, the IRAM location for the thread revival instruction for the next thread is retrieved. It is assumed for purposes of illustration that the contents of revival IRAM address field 374 is 1000110001100 (binary) for the register in which the contents of the thread ID field is 10. Thus, during step 540 the value 1000110001100 (binary) for the revive instruction address for path n with Path ID for GREEN-107 ID is retrieved from the thread status registers 360.

In step 584, the IRAM location for the thread revival instruction for the next thread is sent to the core processor 342. For example the value 1000110001100 (binary) is sent over thread instruction channel 352 and thus provided to the leads on core processor 342 connected to channel 352. The core processor 342 uses this value to retrieve the next instruction from IRAM 244 after the switch thread signal is issued to the flip-flop register 349, as described above in method 400.

In some embodiments, an executing thread that finishes with its exclusive use of a portion of a shared resource sends a lock release signal to the thread scheduler. For example, the following C language statement is issued to send the lock release signal:

call release_plock(vpid)

In step 590, the thread scheduler determines whether it has received a signal that indicates the thread currently executing on a processor no longer uses the exclusive path lock. If so, control passes to step 592. In step 592, the Path Lock field 278 is set to indicate a lock is not granted for the Path ID of the current thread. For example, the one-bit Lock Field is cleared. FIG. 5A shows steps 590 and 592 as part of the thread switch sequence for purposes of illustration. In some embodiments, the thread scheduler receives such a signal outside of the thread switch sequence and performs step 592 upon receipt of that signal. Thus in some embodiments, step 592 is performed by a separate event-driven process at the thread scheduler 350.

Figure 5B:
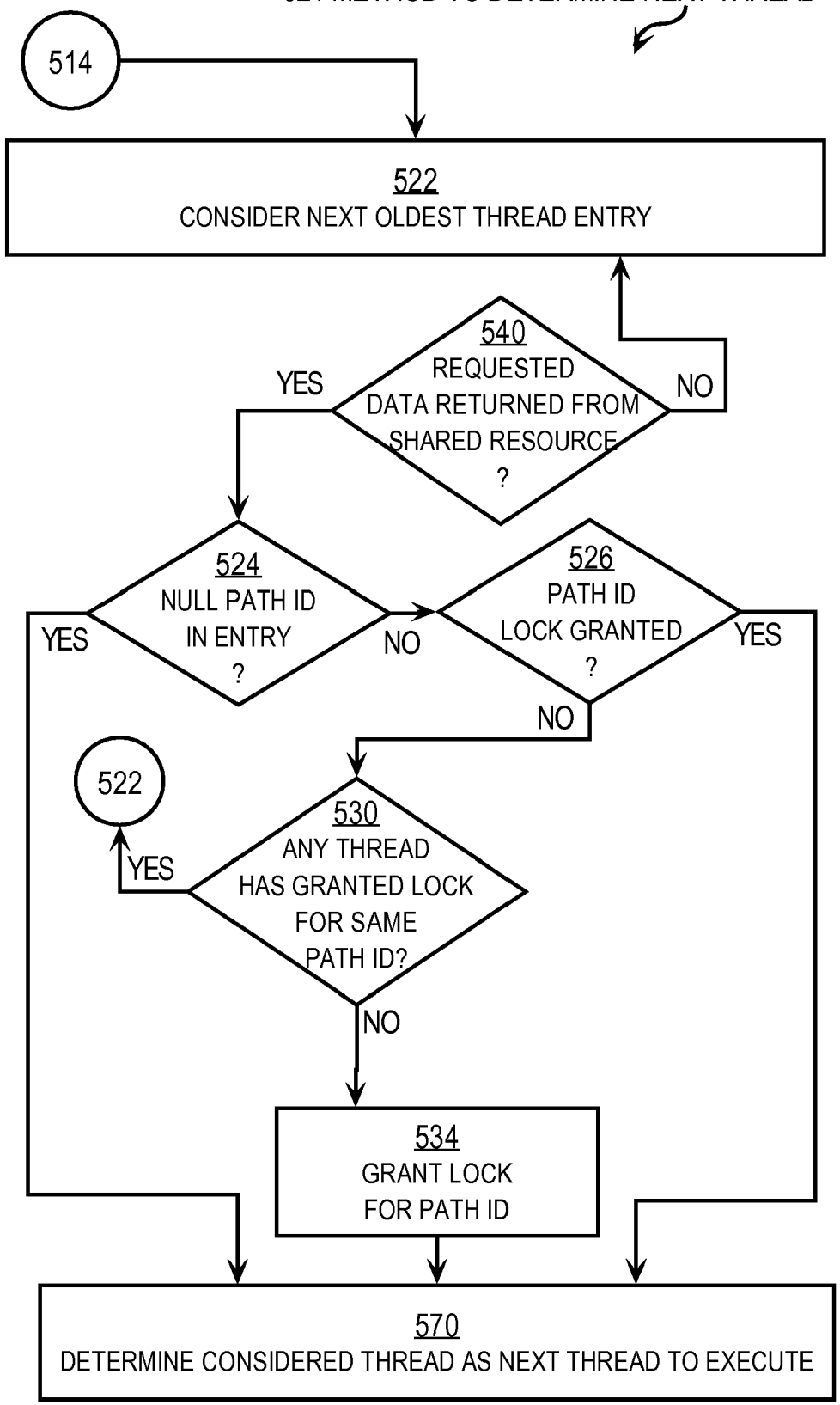
FIG. 5B illustrates a step of the method of FIG. 5A, according to an embodiment.

FIG. 5B illustrates a step 520 of the method 500 of FIG. 5A, according to an embodiment 521. Control passes to embodiment 521 of step 520 from step 514, described above.

In step 522, the next oldest thread in the thread status registers 360 for a given processor is selected for consideration as the next thread. In the illustrated embodiment, the processor selected is the same processor that just sent a signal indicating prepare-to-switch threads. When step 522 is first executed the oldest thread in the thread status registers 360 is selected for consideration. Any method may be used to determine the next oldest thread. For example, in some embodiments, the thread status registers are in a first in first out (FIFO) register bank. In some embodiments, a time stamp field is included in each register. In some embodiments, an age field is included in each register and incremented at regular intervals. If there is no next oldest thread to select, then step 522 includes waiting (idling) for a certain number of clock cycles and then returning to the oldest thread in the registers for the processor.

In step 540, it is determined whether data for the thread under consideration has been returned to the thread scheduler in response to access to a shared resource. If not, the thread is data ineligible and the status field 376 is so marked. Control passes back to step 522 to select the next oldest thread entry for the processor for consideration. If it is determined in step 540 that data for the thread under consideration has been returned to the thread scheduler, then the thread is data eligible to run, the status field is updated to show the thread is data eligible, and control passes to step 524.

In step 524 it is determined whether the Path ID for the thread under consideration has a null or default value in the path ID. Recall that a null or default value indicates that the next portion of the thread does not involve exclusive access to a shared resource. If so, control passes to step 570.

In step 570 the thread under consideration is determined to be the next thread to execute on its processor. There is no conflict with exclusive use of any shared resource.

If it is determined, in step 524, that the Path ID for the thread under consideration has a non-null value in the path ID, then exclusive access to a shared resource is required for the thread, and control passes to step 526. In step 526, it is determined whether the thread scheduler has granted a lock for the Path ID. For example, it is determined whether the value in the Path Lock field 378 indicates a lock is granted.

If it is determined, in step 526, that the thread scheduler has not granted a lock for the Path ID, then control passes to step 530. In step 530, it is determined whether any thread with the same value of Path ID as the thread under consideration has been granted a path lock. If so, the thread under consideration is not eligible for exclusive access to a shared resource, and control passes back to step 522 to consider the next oldest thread entry for the processor.

If it is determined, in step 530, that no other thread with the same value of Path ID as the thread under consideration has been granted a path lock, then control passes to step 534. In step 534, the thread scheduler grants a lock to the thread under consideration. Control then passes to step 570 to select this thread as the next thread to execute. Since a path lock is granted to a thread with the data already returned from the remote resources, the thread with the path lock executes immediately.

If it is determined, in step 526, that the thread scheduler has granted a lock for the Path ID, then control passes to step 570 to select the thread under consideration as the next thread to execute on the processor. No other thread that involves exclusive access to the same portion of the shared resource is currently allowed to execute.

Using the apparatus 300 and method 400 at core processor 342 and method 500 and embodiment 521 at external thread scheduler 350, a thread is switched onto core processor 342 only when a path through instructions executed by the thread is eligible for exclusive access to a portion of a shared resource. Separate lock requests for the shared resources are not employed and therefore can not be held by a thread that is not running.

For example, Pseudo Code 3, described above, for Green Path 107 can be replaced with Pseudo Code 4.

> Thread Switch Path ID = Green 107
> Read Child Structure
> Thread Switch Path ID = Green 107
> Compute Parent Address
> Read Parent Structure
> Thread Switch Path ID = Green 107
> Determine Change to Child Structure
> Update Child Structure
> Determine Change to Parent Structure
> Update Parent Structure
> Thread Switch Path ID = null

This Pseudo Code 4 eliminates two lock commands, two lock release commands and one thread switch (one thread switch is added before the first access of a shared resource, e.g., before Read Child Structure). Similarly, another thread switch is added just before entering Path Red or Path Blue.

Pseudo Code 4 may be implemented with the following C language statements

```
    . . .
    vpid = get_vpid(107, Hierachical_Policing_id)
    prepare_to_switch (path_a, vpid);
    . . .
    next_thread = switch_thread();
    jump next_thread;
path_a:
    call Read_Child_Strucutre
    prepare_to_switch (path_b, vpid);
    . . .
    next_thread = switch_thread();
    jump next_thread;
path_b:
    call Compute_Parent_Address
    Call Read_Parent_Structure
    prepare_to_switch (path_c, vpid);
    . . .
    next_thread = switch_thread();
    jump next_thread;
path_c:
    call Determine_Change_Child_Structure
    call Update_Child_Structure
    call Determine_Change_Parent_Structure
    call Update_Parent_Structure
    . . .
    call release_plock(vpid)
    . . .
    prepare_to_switch (path_d, null);
    . . .
    next_thread = switch_thread();
    jump next_thread;
path_d:
    . . . (no exclusive use of shared resource)
```

No other thread that does hierarchical policing using child record 107 will be allowed to start until this string of reads and writes has been completed. For purposes of illustration it is assumed that thread status registers 360 includes registers for three threads, 381*a*, 381*b*, 381*c* that began running in that order on processor 210*a* and are controlled by thread scheduler 220*a*. When threads 281*a*, 281*b*, 281*c* approached the first thread switch with a non-null Path ID, they each determined a Path ID for Green 107 for instructions at revival address path a. This information was received by path lock process 222 on thread scheduler 220*a* during step 510 and entered in the registers of Thread Status Registers 360 during step 514, as shown by the entries in Table 1. The status is data eligible because the thread is not waiting for data from a shared resource and active because the thread is started but not completed. The Path Lock is not granted because the Path ID for GREEN-107 is new.

TABLE 1

Example Thread Status Registers.

| Processor | Thread | Revival Address | Status | Path ID | Path Lock |
|---|---|---|---|---|---|
| 210a | 281a | path a | data eligible, active | GREEN-107 | No |
| 210a | 281b | path a | data eligible, active | GREEN-107 | No |
| 210a | 281c | path a | data eligible, active | GREEN-107 | No |

In step 520 the next thread is determined. In embodiment 521, it is determined that the path ID for the oldest thread (thread 281*a*) is not null but that the lock is not granted, so control passes to step 530. In step 530 it is determined that no other thread with the same Path ID has a Path Lock, so control passes to step 534. In step 534, the path Lock is granted for thread 281*a* and control passes to step 570 to start executing thread 281*a*. The contents of Thread Status Registers 360 are given by Table 2.

TABLE 2

Example Thread Status Registers at first later time.

| Processor | Thread | Revival Address | Status | Path ID | Path Lock |
|---|---|---|---|---|---|
| 210a | 281a | path a | data eligible, active | GREEN-107 | Yes |
| 210a | 281b | path a | data eligible, active | GREEN-107 | No |
| 210a | 281c | path a | data eligible, active | GREEN-107 | No |

While executing the next instructions for the thread, the read child structure command is encountered. A thread switch occurs with the new path b as the revival instruction but with the same Path ID, GREEN-107 ID. Because data is requested that has not been received, the thread is not data eligible. The thread retains the granted Path Lock for Path ID GREEN-107 ID The Thread Status Registers are as appear in Table 3.

TABLE 3

Example Thread Status Registers at second later time.

| Processor | Thread | Revival Address | Status | Path ID | Path Lock |
|---|---|---|---|---|---|
| 210a | 281b | path a | data eligible, active | GREEN-107 | No |
| 210a | 281c | path a | data eligible, active | GREEN-107 | No |
| 210a | 281a | path b | not data eligible, active | GREEN-107 | Yes |

In step 520 the next thread is determined. In embodiment 521, it is determined that the path ID for the oldest thread (thread 281b) is not null and that the Path Lock is not granted so control passes to step 530. In step 530 it is determined that another thread (281a) has a Path Lock for the same Path ID, so control passes to step 522 to find the next oldest thread. Similarly thread 281c is skipped. When thread 281a is again examined, it is determined that the path ID for thread 281b is not null and that the Path Lock is granted so control passes to step 540. In step 540 it is determined that the data is not yet received, so the thread is not data eligible. This is indicated in the status field and control passes back to step 522 to consider the next oldest thread entry. There isn't any so after idling for a predetermined time, the oldest thread 281b is again considered. It is determined that the path ID is not null and that the Path Lock is not granted so control passes to step 530. In step 530 it is determined that thread 281a already has a granted lock for the same Path ID (Green 107), so control passes back to step 522 to consider the next oldest thread entry, thread 281c. Again there is a non-null Path ID and no granted Lock for thread 281c. In step 530 it is determined that thread 281a already has a granted lock for the same Path ID (Green 107), so control passes back to step 522 to consider the next oldest thread. Neither thread 281b nor thread 281c is allowed to enter path a of GREEN-107 because thread 281a has a path lock on GREEN-107. This process repeats until a different thread with a different Path ID is added to the Thread Status Register, or until it is determined in step 540 that the data is returned from the shared resource.

When it is determined in step 540 that data is received from the shared resource, then the thread 281a is data eligible. The Thread Status Registers are updated as shown in Table 4, and control passes to step 570 to select thread 281a as the next thread to execute.

TABLE 4

Example Thread Status Registers at third later time.

| Processor | Thread | Revival Address | Status | Path ID | Path Lock |
|---|---|---|---|---|---|
| 210a | 281b | path a | data eligible, active | GREEN-107 | No |
| 210a | 281c | path a | data eligible, active | GREEN-107 | No |
| 210a | 281a | path b | data eligible, active | GREEN-107 | Yes |

As thread 281a executes other instructions in path b and path c and accesses other portions of shared resources, thread 281a retains a lock on Path ID for GREEN-107. When the release_plock(vpid) function is called, or the thread does a prepare to switch to a path with a different path ID (e.g., to path d with a null Path ID), the path lock is released for thread 281a, and the Thread Status Registers are updated as shown in Table 5.

TABLE 5

Example Thread Status Registers at fourth later time.

| Processor | Thread | Revival Address | Status | Path ID | Path Lock |
|---|---|---|---|---|---|
| 210a | 281b | path a | data eligible, active | GREEN-107 | No |
| 210a | 281c | path a | data eligible, active | GREEN-107 | No |
| 210a | 281a | path d | data eligible, active | null | No |

During embodiment 521 of step 520, the next thread is determined. The oldest thread entry is 281b with a non-null Path ID, so control passes to step 526. In step 526, it is determined that a path lock has not been granted and control passes to step 530. In step 530 it is determined that no other thread has a lock for the same Path ID for GREEN-107, so control passes to step 534 to grant a Path Lock for thread 281b. Thread Status Registers are updated as shown in Table 6, and thread 281b is determined to be executed next.

TABLE 6

Example Thread Status Registers at fifth later time.

| Processor | Thread | Revival Address | Status | Path ID | Path Lock |
|---|---|---|---|---|---|
| 210a | 281b | path a | data eligible, active | GREEN-107 | Yes |
| 210a | 281c | path a | data eligible, active | GREEN-107 | No |
| 210a | 281a | path d | data eligible, active | null | No |

While thread 281b has a lock on Path ID GREEN-107, thread 281c will not be selected as the next thread.

Using the methods described above, conflicts are avoided at shared resources without obtaining locks on resources and thus without holding locks for threads that are not running. These methods speed the processing of data packets received on a network interface and enable line rate processing for faster line speeds.

6.0 Router Hardware Overview

FIG. 6 illustrates a computer system 600 serving as a router for which an embodiment of the invention may be implemented by replacing one or more of conventional components described here with one or more components described above.

Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 610 for use by the processor from an external terminal 612, such as a terminal with a keyboard containing alphanumeric keys operated by a human user, or a sensor. A sensor detects conditions in its vicinity and transforms those detections into signals compatible with the signals used to represent information in computer system 600. Other external components of terminal 612 coupled to bus 610, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 612. In some embodiments, terminal 612 is omitted.

Computer system 600 also includes one or more instances of a communications interface 670 coupled to bus 610. Communication interface 670 provides a two-way communication coupling to a variety of external devices that operate with their own processors, such as printers, scanners, external disks, and terminal 612. Firmware or software running in the computer system 600 provides a terminal interface or character-based command interface so that external commands can be given to the computer system. For example, communication interface 670 may be a parallel port or a serial port such as an RS-232 or RS-422 interface, or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 600 includes switching system 630 as special purpose hardware for switching information for flow over a network. Switching system 630 typically includes multiple communications interfaces, such as communications interface 670, for coupling to multiple other devices. In general, each coupling is with a network link 632 that is connected to another device in or attached to a network, such as local network 680 in the illustrated embodiment, to which a variety of external devices with their own processors are connected. In some embodiments an input interface or an output interface or both are linked to each of one or more external network elements. Although three network links 632a, 632b, 632c are included in network links 632 in the illustrated embodiment, in other embodiments, more or fewer links are connected to switching system 630. Network links 632 typically provides information communication through one or more networks to other devices that use or process the information. For example, network link 632b may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides routing information for use with switching system 630.

The switching system 630 includes logic and circuitry configured to perform switching functions associated with passing information among elements of network 680, including passing information received along one network link, e.g. 632a, as output on the same or different network link, e.g., 632c. The switching system 630 switches information traffic arriving on an input interface to an output interface according to pre-determined protocols and conventions that are well known. In some embodiments, switching system 630 includes its own processor and memory to perform some of the switching functions in software. In some embodiments, switching system 630 relies on processor 602, memory 604, ROM 606, storage 608, or some combination, to perform one or more switching functions in software. For example, switching system 630, in cooperation with processor 604 implementing a particular protocol, can determine a destination of a packet of data arriving on input interface on link 632a and send it to the correct destination using output interface on link 632c. The destinations may include host 682, server 692, other terminal devices connected to local network 680 or Internet 690, or other routing and switching devices in local network 680 or Internet 690.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620 and circuits in switching system 630, may be used in place of or in combination with software to implement the invention. Thus, embodiments of the invention are not limited to any specific combination of hardware and software.

The signals transmitted over network link 632 and other networks through communications interfaces such as interface 670, which carry information to and from computer system 600, are exemplary forms of carrier waves. Computer system 600 can send and receive information, including program code, through the networks 680, 690 among others, through network links 632 and communications interfaces such as interface 670. In an example using the Internet 690, a server 692 transmits program code for a particular application, requested by a message sent from computer 600, through Internet 690, ISP equipment 684, local network 680 and network link 632*b* through communications interface in switching system 630. The received code may be executed by processor 602 or switching system 630 as it is received, or may be stored in storage device 608 or other non-volatile storage for later execution, or both. In this manner, computer system 600 may obtain application program code in the form of a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 632*b*. An infrared detector serving as communications interface in switching system 630 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602 or switching system 630.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   causing threads of a plurality of threads that access a particular portion of a shared computational resource during a particular instruction path to be scheduled at a thread scheduler for a set of one or more processors;
   receiving, at the thread scheduler, data that indicates a first thread of the plurality of threads is to execute next the particular instruction path to access the particular portion of the shared computational resource, wherein a path identifier (ID) is received and is indicative of the particular instruction path to access the particular portion of the shared computational resource;
   determining whether a second thread of the plurality of threads is eligible to execute the particular instruction path on any processor of the set of one or more processors to access the particular portion of the shared computational resource;
   if it is determined that the second thread is eligible to execute the particular instruction path, then preventing the first thread from executing any instruction from the particular instruction path on any processor of the set of one or more processors; and
   storing data that indicates the path ID in association with data that indicates the first thread.

2. A method as recited in claim 1, further comprising:
   marking the first thread as eligible to execute the particular instruction path on any processor of the set of one or more processors to access the particular portion of the shared computational resource.

3. A method as recited in claim 2, wherein a thread of the plurality of threads is not marked as eligible to execute the particular instruction path on any processor of the set of one or more processors based on order of data packets received on a network interface.

4. A method as recited in claim 1, further comprising:
   receiving data that indicates the second thread rescinds use of the particular instruction path to access the particular portion of the shared computational resource; and
   in response to receiving data that indicates the second thread rescinds use of the particular instruction path, marking the second thread as not eligible to execute the particular instruction path on any processor of the set of one or more processors to access the particular portion of the shared computational resource.

5. A method as recited in claim 4, the step of receiving data that indicates the second thread rescinds use of the particular instruction path further comprising receiving data that indicates the second thread is to execute next an instruction path different from the particular instruction path.

6. A method as recited in claim 1, wherein the particular instruction path does not include an instruction to request a lock on the particular portion of the shared computational resource.

7. A method as recited in claim 1, further comprising, if it is determined that no other thread is eligible to execute the particular instruction path to access the particular portion of the shared computational resource, then storing, in flag data associated with data that indicates the first thread, a value that indicates a lock is granted for the first thread for execution of the particular instruction path to access the particular portion of the shared computational resource.

8. A method as recited claim 1, further comprising:
   determining whether flag data associated with data that indicates the second thread holds a value that indicates a lock is granted for execution of the particular path to access the particular portion of the shared computational resource.

9. A method comprising:
receiving data that indicates a unique path identifier (ID) for a particular instruction path, wherein a particular portion of a shared computational resource is accessed within the particular instruction path;
receiving data that indicates a processor is to execute the particular instruction path;
sending, to a thread scheduler, switch data that indicates the processor should switch to another thread and that indicates the path ID; and
accessing the particular portion of the shared computational resource when the thread scheduler determines, based at least on the path ID, that another thread is not eligible to execute the particular instruction path to access the particular portion of the shared computational resource, wherein the receiving of data that indicates the path ID further comprises:
receiving data that indicates a particular queue of data to be processed by the particular instruction path; and
determining the path ID based on the particular queue of data.

10. An apparatus for processing a thread of a plurality of threads that share a processor, comprising:
means for causing threads of a plurality of threads that access a particular portion of a shared computational resource during a particular instruction path to be received at a thread scheduler for a set of one or more processors;
means for receiving, at the thread scheduler, data that indicates a first thread of the plurality of threads is to execute next the particular instruction path to access the particular portion of the shared computational resource, wherein a path identifier (ID) is received and is indicative of the particular instruction path to access the particular portion of the shared computational resource;
means for determining whether a second thread of the plurality of threads is eligible to execute the particular instruction path on any processor of the set of one or more processors to access the particular portion of the shared computational resource;
means for preventing the first thread from executing any instruction from the particular instruction path on any processor of the set of one or more processors, if it is determined that the second thread is eligible to execute the particular instruction path; and
storing data that indicates the path ID in association with data that indicates the first thread.

11. An apparatus comprising:
one or more processors;
software encoded as instructions in one or more non-transitory computer-readable media for execution on the one or more processors;
a computational resource to be shared among a plurality of execution threads executing the software on the one or more processors;
a single thread scheduler for scheduling the plurality of execution threads, wherein the thread scheduler includes logic encoded in one or more tangible media for execution and, when executed, operable for:
receiving data that indicates a first thread of the plurality of execution threads is to execute next a particular instruction path in the software to access a particular portion of the computational resource, wherein a path identifier (ID) is received and is indicative of the particular instruction path to access the particular portion of the shared computational resource;
determining whether a second thread of the plurality of threads is eligible to execute the particular instruction path on any processor of the one or more processors to access the particular portion of the computational resource;
if it is determined that the second thread is eligible to execute the particular instruction path, then preventing the first thread from executing any instruction from the particular instruction path on any processor of the one or more processors; and
storing data that indicates the path ID in association with data that indicates the first thread.

12. An apparatus as recited in claim 11, wherein the logic, when executed, is further operable for, if it is determined that no other thread is eligible to execute the particular instruction path to access the particular portion of the shared computational resource, then marking the first thread as eligible to execute the particular instruction path on any processor of the one or more processors to access the particular portion of the shared computational resource.

13. An apparatus as recited in claim 12, wherein a thread of the plurality of execution threads is not marked as eligible to execute the particular instruction path on any processor of the one or more processors based on order of data packets received on a network interface.

14. An apparatus as recited in claim 11, wherein the logic, when executed, is further operable for, if it is determined that the second thread is eligible to execute the particular instruction path to access the particular portion of the shared computational resource, then performing:
receiving data that indicates the second thread rescinds use of the particular instruction path to access the particular portion of the shared computational resource; and
in response to receiving data that indicates the second thread rescinds use of the particular instruction path, marking the second thread as not eligible to execute the particular instruction path on any processor of the one or more processors to access the particular portion of the shared computational resource.

15. An apparatus as recited in claim 14, the step of receiving data that indicates the second thread rescinds use of the particular instruction path further comprising receiving data that indicates the second thread is to execute next an instruction path different from the particular instruction path.

16. An apparatus as recited in claim 11, wherein the particular instruction path does not include an instruction to request a lock on the particular portion of the shared computational resource.

17. An apparatus as recited in claim 11, wherein the logic, when executed, is further operable for, if it is determined that no other thread is eligible to execute the particular instruction path to access the particular portion of the shared computational resource, then storing, in flag data associated with data that indicates the first thread, a value that indicates a lock is granted for the first thread for execution of the particular instruction path to access the particular portion of the shared computational resource.

18. An apparatus as recited in claim 17 further comprising:
determining whether flag data associated with data that indicates the second thread holds a value that indicates a lock is granted for execution of the particular path to access the particular portion of the shared computational resource.

19. An apparatus as recited in claim 11, wherein:
the apparatus further comprises a network interface that is in communication with a packet-switched network for communicating therewith a data packet;
data packets belonging to a particular flow are processed by the one or more processors for which threads are scheduled by the thread controller.

20. A method for achieving near line rate processing of data packets at a router comprising:
receiving over a first network interface a first set of one or more data packets;
storing data based on the first set of one or more data packets in a particular queue in a shared memory; and
determining a second set of one or more data packets to send through a different second network interface based on data in the particular queue, including:
receiving, at the thread scheduler, data that indicates a first thread of the plurality of threads is to execute next a particular instruction path that includes one or more instructions to access the particular queue, wherein a path identifier (ID) is received and is indicative of the particular instruction path to access the particular queue;
determining whether a second thread of the plurality of threads is eligible to execute the particular instruction path on any processor of a set of one or more processors to access the particular queue;
if it is determined that the second thread is eligible to execute the particular instruction path to access the particular queue, then preventing the first thread from executing any instruction from the particular instruction path on any processor of the set of one or more processors to access the particular queue; and
storing data that indicates the path ID in association with data that indicates the first thread.

* * * * *